July 12, 1966 N. L. DE JARLD 3,260,923

CIRCUIT FOR PROVIDING A PULSE TYPE OUTPUT

Filed April 16, 1962 3 Sheets-Sheet 1

FIG. 2

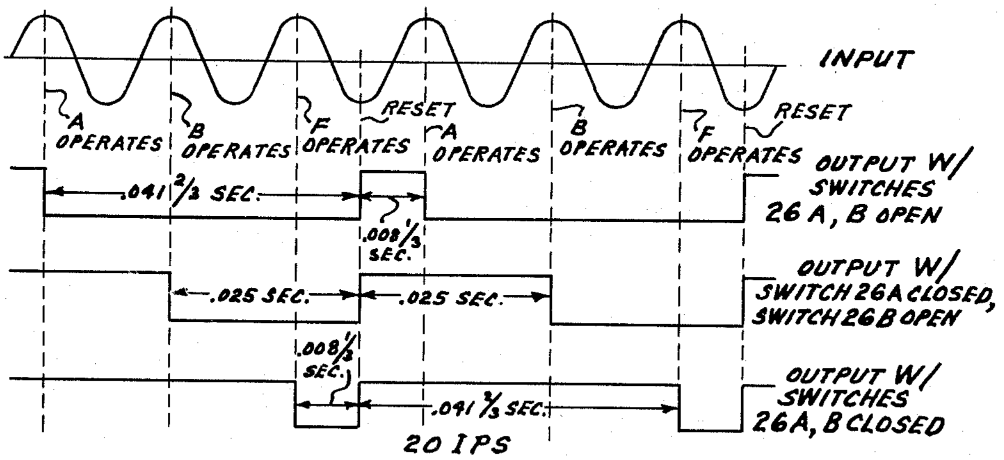

| OUTPUT | SHORTING SWITCHES OPERATED | MAKE TIME (SEC.) | BREAK TIME (SEC.) | MAKE TIME (%) | BREAK TIME (%) |
|---|---|---|---|---|---|
| 30 IPS | NONE | .008 1/3 | .025 | 25% | 75% |
| | 26 A | .025 | .008 1/3 | 75% | 25% |
| 20 IPS | NONE | .008 1/3 | .041 2/3 | 16 2/3 | 83 1/3% |
| | 26 A | .025 | .025 | 50% | 50% |
| | 26 A, B, | .041 2/3 | .008 1/3 | 83 1/3% | 16 2/3% |
| 15 IPS | NONE | .008 1/3 | .058 1/3 | 12 1/2% | 87 1/2% |
| | 26 A | .025 | .041 2/3 | 37 1/2% | 62 1/2% |
| | 26 A, B | .041 2/3 | .025 | 62 1/2% | 37 1/2% |
| | 26 A, B, C | .058 1/3 | .008 1/3 | 87 1/2% | 12 1/2% |
| 12 IPS | NONE | .008 1/3 | .075 | 10% | 90% |
| | 26 A | .025 | .058 1/3 | 30% | 70% |
| | 26 A, B | .041 2/3 | .041 2/3 | 50% | 50% |
| | 26 A, B, C | .058 1/3 | .025 | 70% | 30% |
| | 26 A, B, C, D | .075 | .008 1/3 | 90% | 10% |
| 10 IPS | NONE | .008 1/3 | .091 2/3 | 8 1/3% | 91 2/3% |
| | 26 A | .025 | .075 | 25% | 75% |
| | 26 A, B | .041 2/3 | .058 1/3 | 41 2/3% | 58 1/3% |
| | 26 A, B, C | .058 1/3 | .041 2/3 | 58 1/3% | 41 2/3% |
| | 26 A, B, C, D | .075 | .025 | 75 | 25% |
| | 26 A, B, C, D, E | .091 2/3 | .008 1/3 | 91 2/3% | 8 1/3% |

FIG. 3

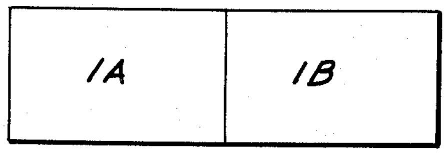

FIG. 1

INVENTOR
N. L. DE JARLD
BY J. L. Landis
ATTORNEY

July 12, 1966 N. L. DE JARLD 3,260,923

CIRCUIT FOR PROVIDING A PULSE TYPE OUTPUT

Filed April 16, 1962 3 Sheets-Sheet 2

INVENTOR
N. L. DE JARLD
BY J. J. Landis
ATTORNEY

CIRCUIT FOR PROVIDING A PULSE TYPE OUTPUT

Filed April 16, 1962 3 Sheets-Sheet 3

INVENTOR
N. L. DeJARLD
BY J. S. Landis
ATTORNEY

United States Patent Office 3,260,923

Patented July 12, 1966

3,260,923

CIRCUIT FOR PROVIDING A PULSE TYPE OUTPUT

Norman L. De Jarld, Lockport, Ill., assignor to Western Electric Company, Incorporated, New York, N.Y., a corporation of New York Filed Apr. 16, 1962, Ser. No. 187,773

5 Claims. (Cl. 321—70)

Figure 1A:
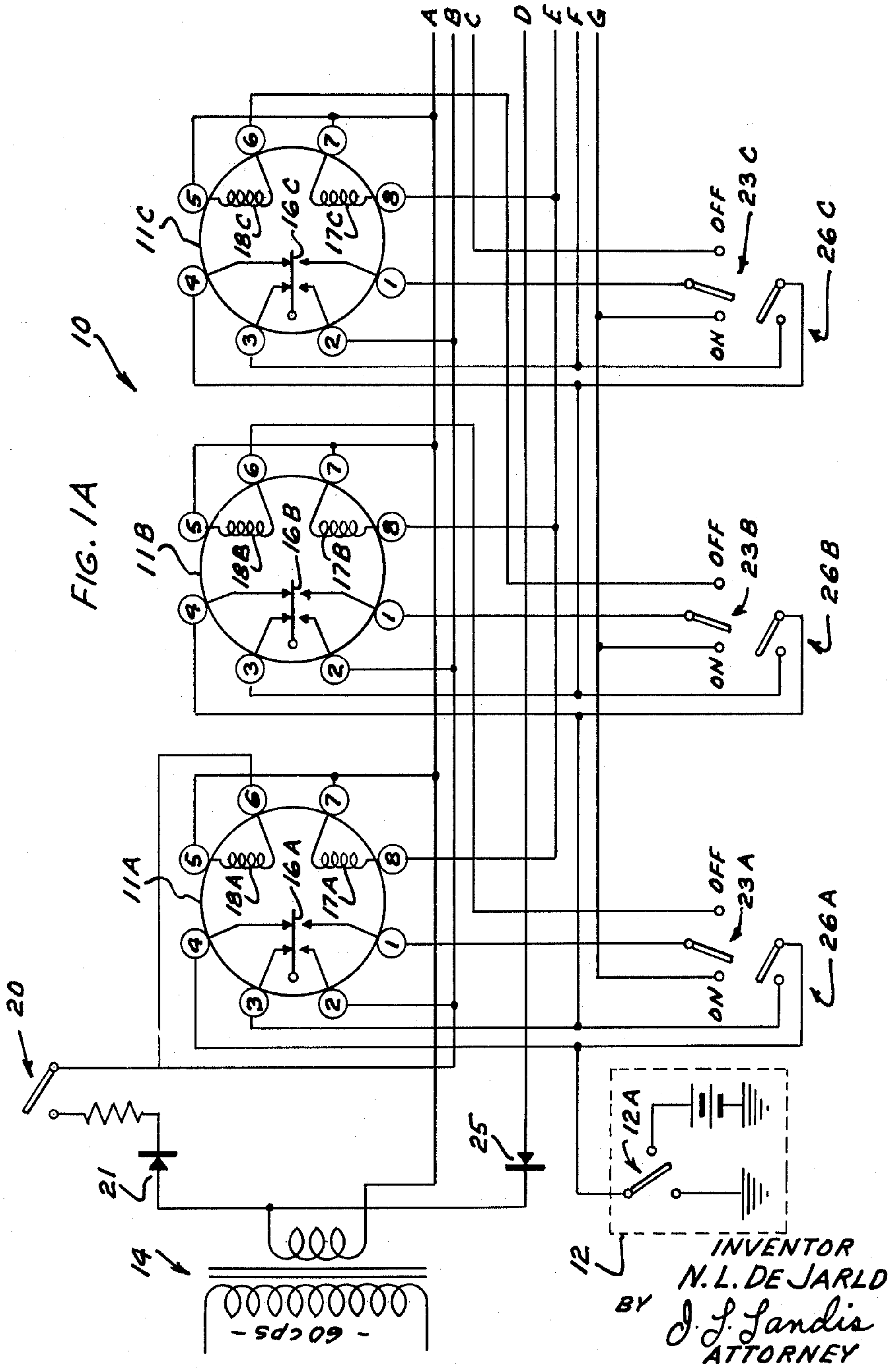

This invention relates to a circuit for providing a pulse type output, and more specifically to a circuit for providing a pulse type output wherein the frequency and the period of the pulses are regulatable. Objects of this invention are to provide circuits of such character.

In many testing operations, such as loop-and-leak testing of step-by-step telephone networks, pulse type outputs must be applied to the test equipment to initiate and control various tests. Often, the frequency and the period of the pulses must be varied for different tests to be performed, and therefore it is desirable that a single pulsing circuit be utilized wherein the frequency and the period of the pulses are regulatable rather than using different pulsing circuits for the different tests.

Another object of this invention is to provide a new and improved circuit for providing a pulse type output wherein circuitry is provided for regulating the frequency and the period of the pulses outside the limits determined by the circuit characteristics.

An additional object of this invention is to provide a new and improved circuit for providing a pulse type output wherein the frequency and the period of the pulses are regulatable, which circuit is less complex and more economical than present commercially available circuits.

With these and other objects in mind, the present invention relates to a circuit responsive to an alternating control signal for providing a pulse type output wherein the frequency and the period of the pulses are regulatable. A series of control devices are provided which are capable of responding to a cycle of the alternating control signal to open circuit a connection therethrough and to condition a succeeding control device for operation. An output signal source is connected through all the control devices to an output conductor so that a pulse type output may be provided in the output conductor by intermittently open circuiting the connection between the output conductor and the output signal source. Circuitry is provided for associating selected ones of the control devices with the alternating control signal so that each succeeding one of the selected control devices responds to a succeeding cycle of the alternating control signal to condition the next succeeding selected control device for responding to the next control signal cycle and to open circuit the connection between the output signal source and the output conductor. In response to the operation of the last one of the selected control devices, circuitry operates to reset the control devices so that the connection between the output signal source and the output conductor is re-established and the first control device is conditioned for responding to the next cycle of the control signal. Thus, the circuit provides a pulse type output in the output conductor which has a frequency equal to the control signal frequency divided by the number of control devices selectively associated with the control signal. Additionally, circuitry is provided to negate the open circuiting effect of selected ones of the control devices selectively associated with the alternating control signal so that the period of the pulses provided in the output conductor are regulatable within limits determined by the circuit characteristics.

Figure 1B:
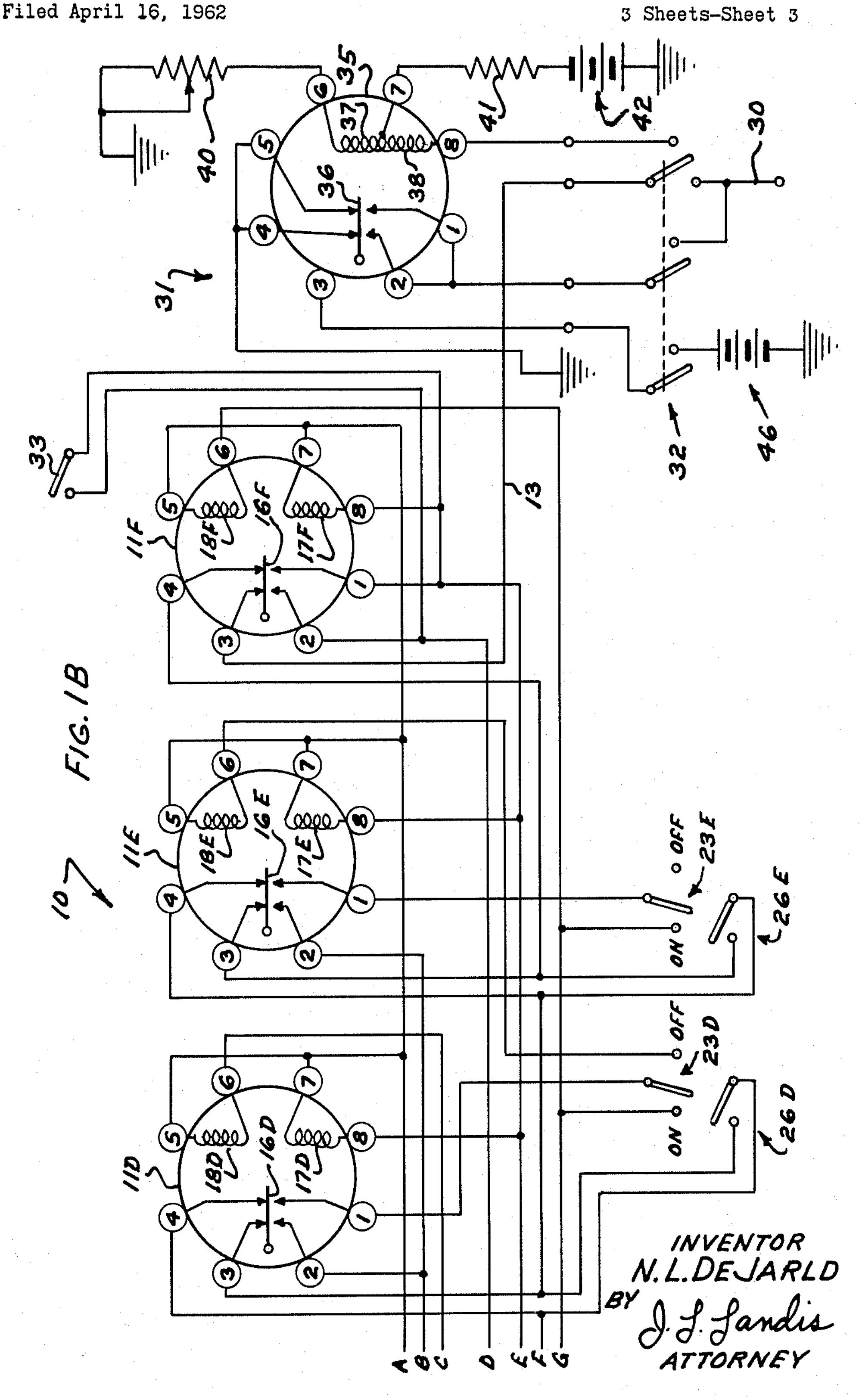

Other objects, advantages, and features of the invention will become apparent by reference to the following detailed description and accompanying drawings, which illustrate a preferred embodiment thereof. In the drawings, FIG. 1 depicts the manner in which FIGS. 1A and 1B are to be connected to provide a schematic diagram illustrating the interconnection of the circuit components of the circuit for providing a pulse type output;

FIG. 2 is a diagram of input and output wave forms for one specific operation of the circuit illustrated in FIGS. 1A and 1B; and FIG. 3 is a table illustrating the outputs that may be provided during the various possible operations of the circuit illustrated in FIGS. 1A and 1B.

Referring now to FIGS. 1A and 1B, a pulsing circuit 10 is provided which includes a series of sequentially arranged bistable elements, preferably mercury relays 11A–11F as illustrated, and which is provided for controlling the transmission of an input signal from a D.C. or ground source 12 to a conductor 13 in response to the transmission thereto of an A.C. control signal from a transformer 14 so that a pulse type output is provided in the conductor 13. Each of the mercury relays 11A–11F includes (1) a pair of primary contact terminals 11A3 and 11A4 and 11F4, (2) a pair of secondary contact terminals 11A1 and 11A2 to 11F1 and 11F2, (3) a contact arm 16A–16F, (4) a primary input winding 17A–17F, and (5) a secondary input winding 18A–18F.

When the contact arm 16A–16F of one of the mercury relays 11A–11F is in engagement with the associated primary contact terminals 11A3 and 11A4 to 11F3 and 11F4 and a positive signal of sufficient amplitude is applied to the associated secondary input winding 18A–18F, a field is induced which causes the contact arm to be driven into engagement with the associated secondary contact terminals 11A1 and 11A2 to 11F1 and 11F2. When the contact arm 16A–16F of one of the mercury relays 11A–11F is in engagement with the associated secondary contact terminals 11A1 and 11A2 to 11F1 and 11F2 and a negative signal of sufficient amplitude is applied to the associated primary input windings 17A–17F, a field is induced which causes the contact arm to be driven into engagement with the associated primary contact terminals 11A3 and 11A4 to 11F3 and 11F4.

The conductor 13 is connected to the D.C. or ground source 12 through the primary contact terminals 11A3 and 11A4 to 11F3 and 11F4 of all the mercury relays 11A–11F so that a D.C. or ground signal is transmitted from the source 12 to the conductor 13 only when a circuit is completed across the primary contact terminals 11A3 and 11A4 to 11F3 and 11F4 of all the mercury relays 11A–11F.

The secondary input winding 18A of the first mercury relay 11A is connected across the secondary of the transformer 14 through a start switch 20 and a diode 21 so that the positive half cycles of the A.C. control signal provided by the transformer 14 are applied thereto, to cause the contact arm 16A to be driven out of engagement with the primary contact terminals 11A3 and 11A4 and into engagement with the secondary contact terminals 11A1 and 11A2, when the start switch 20 is closed. The secondary input winding 18B–18E of each succeeding one of the mercury relays 11B–11E is connected across the secondary of the transformer 14 through the off contact of a selective on-off switch 23A–23D associated with the next preceding one of the mercury relays 11A–11D, through the secondary contact terminals 11A1 and 11A2 to 11D1 and 11D2 of the next preceding one of the mercury relays 11A–11D, through the start switch 20 and through the diode 21 so that the positive half cycles of the A.C. control signal are applied thereto, to cause the contact arm thereof to be driven out of engagement with the primary contact terminals and into engagement with the secondary contact terminals, when (1) the start switch 20 is closed, (2) the selective on-off switch associated with the next preceding mercury relay is switched to the off position, and (3) the contact arm of the next preceding mercury relay is in engagement with the secondary contact terminals thereof.

The secondary input winding 18F of the last mercury relay 11F is connected across the secondary of the transformer 14 through the on contacts of each of the selective on-off switches 23A–23E associated with the mercury relays 11A–11E, through the secondary contact terminals 11A1 and 11A2 to 11E1 and 11E2 of each of the mercury relays 11A–11E, through the start switch 20 and through the diode 21 so that the positive half cycles of the A.C. control signal are applied thereto, to cause the contact arm 16F to be driven out of engagement with the primary contact terminals 11F3 and 11F4 and into engagement with the secondary contact terminals 11F1 and 11F2, when (1) the start switch 20 is closed, (2) one of the selective on-off switches has been switched to the on position, and (3) the contact arm of the mercury relay associated with the selective on-off switch that is in the on position is in engagement with the secondary contact terminals thereof.

The primary input windings 17A–17F of all the mercury relays 11A–11F are connected across the secondary of the transformer 14 through the secondary contact terminals 11F1 and 11F2 of the mercury relay 11F and through a diode 25 so that the negative half cycles of the A.C. control signal are applied thereto, to cause the contact arms 16A–16F which are in engagement with the secondary contact terminals 11A1 and 11A2 to 11F1 and 11F2 to be driven into engagement with the primary contact terminals 11A3 and 11A4 to 11F3 and 11F4, when the contact arm of the mercury relay 11F is in engagement with the secondary contact terminals 11F3 and 11F4 thereof.

The amplitude of the A.C. control signal is so selected that, when the A.C. control signal is applied to an input winding of a mercury relay, the A.C. control signal must approximately reach its peak value before a field of sufficient force is induced to cause the contact arm of the mercury relay to be driven from engagement with one pair of contact terminals into engagement with the other pair of contact terminals.

Shorting switches 26A–26E are connected across the primary contact terminals 11A3 and 11A4 to 11E3 and 11E4 of the mercury relays 11A–11E so that, when a shorting switch is closed, the connection between the source 12 and the conductor 13 is not open circuited as the contact arm of the associated mercury relay is moved out of engagement with the primary contact terminals and into engagement with the secondary contact terminals. Thus, the effect of operation of selected ones of the mercury relays 11A–11E may be negated by closing selected ones of the shorting switches 26A–26E.

With the illustrated pulsing circuit 10, a pulse type output may be provided in the conductor 13 which has a frequency equal to $F/X$, wherein F is the frequency of the A.C. control signal (sixty cycles per second in the illustrated embodiment) X is the number of mercury relays associated with the secondary of the transformer 14, and the period of each pulse of the pulse type output is regulatable within limits determined by the circuit characteristics as set forth below.

The conductor 13 may be connected to an output conductor 30 so that a pulse type output is provided in the output conductor 30 wherein the period of the pulses of the pulse type output are regulatable within limits determined by the characteristics of the pulsing circuit 10, or the conductor 13 may be connected to a fine control pulsing period regulator 31 which is associated with the output conductor 30 so that a pulse type output is provided in the output conductor 30 wherein the period of the pulses of the pulse type output are regulatable outside the limits determined by the characteristics of the pulsing circuit 10, as described in detail hereinafter. A switch 32 is provided to connect the conductor 13 either to the output conductor 30 or to the fine control pulsing period regulator 31.

If the conductor 13 is connected to the output conductor 30, a switch 12A within the D.C. or ground source 12 is positioned so that a D.C. signal is applied to the pulsing circuit 10 whereby a pulse type output having an amplitude equal to the amplitude of the D.C. signal may be provided. If the conductor 13 is connected to the fine control pulsing period regulator 31, the switch 12A is positioned so that a ground signal is applied to the pulsing circuit 10 whereby the ground signal may be intermittently applied to the fine control pulsing period regulator 31 to cause intermittent operation thereof as described in detail hereinafter.

To partially condition the pulsing circuit 10 for operation, the contact arm of one of the on-off switches 23A–23E is moved into engagement with the on contact and the contact arms of the other on-off switches are moved into engagement with the off contacts. If the contact arm of the on-off switch 23A is moved into engagement with the on contact and the contact arms of the other on-off switches 23B–23E are moved into engagement with the off contacts, only the mercury relays 11A and 11F are associated with the secondary of the transformer 14 so that a pulse type output will be provided in the conductor 13 which has 30 i.p.s. (impulses per second). If the on-off switch 23B is switched on and the other on-off switches are switched off, only the mercury relays 11A, 11B and 11F are associated with the secondary of the transformer 14 so that a pulse type output will be provided in the conductor 13 which has 20 i.p.s. If the on-off switch 23C is switched on and the other on-off switches are switched off, only the mercury relays 11A, 11B, 11C and 11F are associated with the secondary of the transformer 14 so that a pulse type output will be provided in the conductor 13 which has 15 i.p.s. If the on-off switch 23D is switched on and the other on-off switches are switched off, only the mercury relays 11A, 11B, 11C, 11D and 11F are associated with the secondary of the transformer 14 so that a pulse type output will be provided in the conductor 13 which has 12 i.p.s. If the on-off switch 23E is switched on and the other on-off switches are switched off, all the mercury relays 11A–11F are associated with the secondary of the transformer 14 so that a pulse type output will be provided in the conductor 13 which has 10 i.p.s.

To further condition the pulsing circuit 10 for operation, a nonlocking reset switch 33 which is connected across the secondary contact terminals 11F1 and 11F2 of the last mercury relay 11F is then momentarily closed to complete a circuit across the secondary contact terminals 11F1 and 11F2. When the nonlocking reset switch 33 is closed, the primary input windings 17A–17F of all the mercury relays 11A–11F are connected across the secondary of the transformer 14 through the circuit completed across the secondary contact terminals 11F1 and 11F2 and the diode 25 so that the next negative half cycle of the A.C. control signal is applied thereto to cause the contact arms 16A–16F of all the mercury relays 11A–11F that are in engagement with the secondary contact terminals 11A1 and 11A2 to 11F1 and 11F2 to be driven into engagement with the primary contact terminals 11A3 and 11A4 to 11F3 and 11F4.

Selected ones of the shorting switches 26A–26E are then closed to selectively preset the make and break times of the connection between the source 12 and the conductor 13 so that output pulses having desired periods may be provided in accordance with the table set forth in FIG. 3 as selected ones of the mercury relays 11A–11F are associated with the A.C. control signal.

Assume, for example, an output of 20 i.p.s. is to be provided. The on-off switch 23B is switched to the on position, the other on-off switches 23A and 23C–23E are switched to the off positions, the nonlocking reset switch 33 is momentarily closed, and the start switch 20 is closed. With this on-off switch setting, the mercury relays 11A, 11B and 11F are associated with the secondary of the transformer 14.

Referring to FIG. 2, if neither of the shorting switches 26A or 26B is closed, the first positive half cycle of the A.C. control signal is applied to the secondary input winding 18A of the first mercury relay 11A and causes the contact arm 16A thereof to move out of engagement with the primary contact terminals 11A3 and 11A4 and into engagement with the secondary contact terminals 11A1 and 11A2 so that the connection between the source 12 and the conductor 13 is open circuited and so that the secondary input winding 18B of the mercury relay 11B is conditioned for receiving the next positive half cycle of the A.C. control signal. In response to the application of the next positive half cycle of the A.C. control signal to the secondary input winding 18B of the mercury relay 11B, the contact arm 16B thereof is moved out of engagement with the primary contact terminals 11B3 and 11B4 and into engagement with the secondary contact terminals 11B1 and 11B2 so that the connection between the source 12 and the conductor 13 is further open circuited and so that the secondary input winding 18F of the last mercury relay 11F is conditioned for receiving the next positive half cycle of the A.C. control signal. In response to the application of the next positive half cycle of the A.C. control signal to the secondary input winding 18F of the last mercury relay 11F, the contact arm 16F thereof is moved out of engagement with the primary contact terminals 11F3 and 11F4 and into engagement with the secondary contact terminals 11F1 and 11F2 so that the connection between the source 12 and the conductor 13 is still further open circuited and so that the primary input windings 17A–17F of all the mercury relays 11A–11F are conditioned for receiving the next negative half cycle of the A.C. control signal. In response to the application of the next negative half cycle of the A.C. control signal to the primary input windings 17A, 17B and 17F of the mercury relays 11A, 11B and 11F, the contact arms 16A, 16B and 16F of the mercury relays are moved out of engagement with the secondary contact terminals thereof and into engagement with the primary contact terminals thereof so that the pulsing circuit 10 is conditioned for a subsequent cycle of operation whereby the next positive half cycle of the A.C. control signal is applied to the secondary input winding 18A of the first mercury relay 11A to cause operation thereof and the above mentioned cycle of operation is repeated.

Thus, it may be seen by referring to FIG. 2 that the connection between the source 12 and the conductor 13 is intermittently open circuited for .041⅔ second (83⅓% break time) and closed to provide an output pulse for .008⅓ second (16⅔% make time), when neither of the shorting switches 26A or 26B is closed.

If the shorting switch 26A is closed and the shorting switch 26B is maintained open, the connection between the source 12 and the conductor 13 is not open circuited until the mercury relay 11B responds to the second positive half cycle of the alternating control signal since the open circuiting effect of the mercury relay 11A is negated by the closed shorting switch 26A. Thus, as may be seen by referring again to FIG. 2, the connection between the source 12 and the conductor 13 is intermittently open circuited for .025 second (50% break time) and closed to provide an output pulse for .025 second (50% make time), when only the shorting switch 26A is closed.

If the shorting switches 26A and 26B are both closed, the connection between the source 12 and the conductor 13 is not open circuited until the last mercury relay 11F responds to the third positive half cycle of the alternating control signal since the open circuiting effect of the mercury relays 11A and 11B are negated by the closed shorting switches 26A and 26B. Thus, as may be seen by referring again to FIG. 2, the connection between the source 12 and the conductor 13 is intermittently open circuited for .008⅓ second (16⅔% break time) and closed to provide an output pulse for .041⅔ second (83⅓% make time), when both the shorting switches 26A and 26B are closed.

If the shorting switch 26B is closed and the shorting switch 26A is open, a non-uniform pulse type output may be provided. However, in most pulsing operations, it is desirable that a uniform pulse type output be provided and therefore the shorting switches 26A and 26B are generally closed in a sequence to provide the pulse type output illustrated in FIG. 2 and set forth in the table of FIG. 3.

As previously set forth, the conductor 13 may be connected to the output conductor 30 or may be connected to the fine control pulsing period regulator 31. If the switch 32 is positioned to connect the conductor 13 to the output conductor 30, the fine control pulsing period regulator 31 is completely removed from association with the pulsing circuit 10 and has no effect on the pulse type output provided in the output conductor 30. If the switch 32 is positioned to connect the conductor 13 to the fine control pulsing period regulator 31, ground pulses are intermittently applied to the regulator 31 to cause intermittent operation thereof.

The fine control pulsing period regulator 31 includes a bistable element 35, also preferably a mercury relay as illustrated which is similar to the mercury relays 11A–11F as set forth above, and the mercury relay 35 includes (1) a pair of primary contact terminals 35–4 and 35–5, (2) a pair of secondary contact terminals 35–1 and 35–2, (3) a contact arm 36, (4) a primary input winding 37, and (5) a secondary input winding 38 which is identical to the primary input winding 37.

One end of the primary input winding 37 is connected through a variable resistor 40 to ground and the other end thereof is connected through a resistor 41 and a D.C. source 42 to ground so that a bias field is continuously induced, by current flowing through the primary input winding 37, which retains the contact arm 36 in engagement with the primary contact terminals 35–4 and 35–5. Thus, the effect of the bias field must be overcome before the contact arm 36 may be driven out of engagement with the primary contact terminals 35–4 and 35–5 and into engagement with the secondary contact terminals 35–1 and 35–2, and the strength of the bias field is regulatable by varying the setting of the variable resistor 40.

One end of the secondary input winding 38 is also connected through the resistor 41 and the D.C. source 42 to ground and the other end thereof is connected through the switch 32 to the conductor 13. If the switch 32 is positioned to connect the conductor 13 to the fine control pulsing period regulator 36, ground signals will be intermittently applied to the end of the secondary input winding 38 not connected to the resistor 41 and the D.C. source 42. The ground signals will be applied to the secondary input winding 38 in accordance with the operation of the pulsing circuit 10 as described in detail above for a 20 i.p.s. output.

In response to the application of the ground signals to the secondary input winding 38, a field is induced by current flowing through the secondary input winding 38 which opposes the field continuously induced by current flowing through the primary input winding 37. Since the variable resistor 40 adds more resistance in series with the primary input winding 37 and thus causes a lesser amount of current to flow therethrough than flows through the secondary input winding 38, the field induced by current flowing through the secondary input winding 38 is greater than the field induced by current flowing through the primary input winding 37 so that the contact arm 36 is driven out of engagement with the primary contact terminals 35–4 and 35–5 and into engagement with the secondary contact terminals 35–1 and 35–2. The time required for the contact arm 36 to be driven into engagement with the secondary contact terminals is dependent on the differential between the field strengths and is therefore dependent upon the setting of the variable resistor 40.

When the switch 32 is positioned to connect the output conductor 13 to the fine control pulsing period regulator 31, a D.C. source 46 is connected to the contact arm 36 and the secondary contact terminals 35–1 and 35–2 are connected to the output conductor 30. Thus, as the contact arm 36 is intermittently driven into engagement with the secondary contact terminals in response to the intermittent application of ground signals to the secondary input winding 38, a pulse type output is provided in the output conductor 30 which has an amplitude equal to the amplitude of the D.C. signal provided by the D.C. source 46. If essentially no time is required for the contact arm 36 to be driven from engagement with the primary contact terminals 35–4 and 35–5 into engagement with the secondary contact terminals 35–1 and 35–2, the period of the pulses provided in the output conductor 30 will be essentially identical to the period of the pulses provided in the output conductor 30 when the conductor 13 is connected to the output conductor 30. However, as the setting of the variable resistor 40 is varied to cause a time period to be required to drive the contact arm 36 from engagement with the primary contact terminals 35–4 and 35–5 into engagement with the secondary contact terminals 35–1 and 35–2, the period of the pulses provided in the output conductor 30 will be altered, and thus the period of the pulses may be regulated outside the limits determined by the characteristics of the pulsing circuit 10 by varying the setting of the variable resistor 40.

Thus it may be seen that a circuit for providing a pulse type output has been provided wherein the frequency and the period of the pulses are regulatable within limits determined by the characteristics of the pulsing circuit 10 and wherein the period of the pulses may be regulated outside the limits determined by the characteristics of the pulsing circuit 10.

While one specific embodiment of the invention has been described in detail, it will be obvious that various modifications may be made from the specific details described without departing from the spirit and scope of the invention.

What is claimed is:

1. A frequency divider, responsive to an alternating control signal, for producing a pulse-type output signal wherein the periods of the pulses are regulatable, which comprises:

a power source for the output signal;

a plurality of relays;

each of said relays having operating means actuatable by a prescribed instantaneous level of the alternating control signal, and first and second switch means mutually actuatable by said operating means in response to such actuation thereof;

each of said first switch means, when so actuated, serving to apply the alternating control signal to the operating means of a next successive one of said relays, and each of said relays having an operating time greater than the duration of the prescribed level of the alternating control signal within a single cycle, whereby successive relays are actuatable only upon successive cycles of the alternating control signal;

means responsive to actuation of the first switch means corresponding to the last relay in the succession, for resetting all of said relays to restore all actuated switch means thereof to an unactuated condition;

said second switch means being arranged to form a series circuit with said power source, and serving to interrupt said series circuit upon actuation and until resetting of the corresponding relay operating means, the total number of relays successively actuated being determinative of the frequency of the pulse-type output signal; and means for shorting out the second switch means of a selected number of relays, beginning with the first in the succession, to negate the open-circuiting effect of such second switch means in said series circuit, whereby a completed output circuit may be maintained prior to interruption for a number of cycles corresponding to the number of relays having shorted second switch means, to produce a pulse having a controlled period of duration.

2. The frequency divider as specified in claim 1, wherein:

the control signal is a sinusoidal signal of alternating polarity;

the relays are bistable devices having primary and secondary coils as operating means, the secondary coil being responsive to a selected instantaneous level of control signal at a first polarity to close said first switch means and to open said second switch means, and the primary coil being responsive to a selected instantaneous level of control signal of opposite polarity to reset said first and second switch means to the open and closed conditions, respectively;

means are provided for selectively connecting the first switch means of each of said relays to the secondary coil of the next succeeding relay in the succession and alternatively to the resetting means, so that the number of relays beginning with the first which are to be successively energized may be selected; and the resetting means applies the prescribed level of the alternating control signal of said opposite polarity to the primary coils of all of said relays after the selected number of relays has been energized;

the number of successive relays selectively interconnected determining the frequency of output signal, and the number of successive selected relays beginning with the first in the succession, for which the open-circuiting effect of actuation of said second switch means is successively negated, determining the period of the pulses.

3. The frequency divider as specified in claim 1, wherein:

a second power source is provided;

a control relay is provided;

said control relay having operating means actuatable and deactuatable in response to completion and interruption, respectively, of the output circuit established through the second switch means and the shorting meanings, and contact means actuatable by said operating means of said control relay to complete a second output circuit in series with said second source; and means are provided for introducing an adjustable delay in the operating time of said control relay;

whereby fine adjustment is provided for the period of the pulses in the second output signal, such period being determined by (1) the number of cycles of the alternating control signal that the open-circuiting effect of actaution of the second switching means for successive relays is negated, and (2) the additional time within a cycle that said contact means of said control relay maintain an actuated condition after the adjustable delay.

4. A frequency divider, responsive to a sinusoidal control signal of alternating polarity, for producing a pulse-type output signal wherein the frequency and the periods of the pulses are regulatable, which comprises:

a plurality of bistable mercury relays;

each of said mercury relays having primary and secondary input windings and primary and secondary contact terminals;

said primary input winding being energizable to close said primary contact terminals in response to a prescribed instantaneous level of the control signal of a first polarity;

said secondary input winding being energizable to close said secondary contact terminals in response to a prescribed instantaneous level of the control signal of opposite polarity;

means for selectively connecting said secondary contact terminals of each relay to said secondary input winding of a next succeeding relay and alternatively to the secondary input winding of a last one of the relays in the succession, the closure of said secondary contact terminals of each relay serving to apply the control signal to the secondary input winding connected thereto so that a selected number of relays may be successively energized accordingly;

each of said mercury relays having an operating time greater than the duration of the prescribed level of the first polarity control signal within a single cycle, whereby the selected number of relays are successively actuatable to close said secondary contact terminals thereof only upon successive cycles of the alternating control signal;

said secondary contact terminals of said last relay in the succession being arranged in series with the primary input winding of all of said relays to apply the prescribed level of the opposite polarity control signal thereto, so that after the selected number of relays have been successively actuated, all of said primary input windings are energized to close all primary contact terminals and to open all secondary contact terminals;

a first power source for producing an output signal;

said primary contact terminals of each relay being arranged to form a series circuit connectable to said first power source, and serving to interrupt said series circuit upon energization of the secondary input winding of the corresponding relay and until energization of the primary input windings of all the relays, the total number of relays successively actuated to interrupt said series circuit being determinative of the frequency of the pulse-type output signal; and switch means for shorting out the primary contact terminals of a selected number of relays beginning with the first in the succession, to negate the open-circuiting effect in said series circuit of energization of the secondary input windings of the corresponding relays, whereby a first completed output circuit may be maintained prior to interruption for a prescribed number of cycles of the alternating control signal corresponding to the number of relays having shorted primary contact terminals, to produce a pulse for a regulatable period of duration.

5. The frequency divider, as recited in claim 4, wherein a fine adjustment of the pulse-period is provided by a circuit comprising:

a second output signal source;

a bistable control relay;

said control relay having primary and secondary input windings, and primary and secondary contact terminals;

means for applying an adjustable bias to said primary input winding of said control relay which operates to hold said primary contact terminals thereof in a normally closed condition and to hold said secondary contact terminals in a normally open condition;

means selectively arranged in circuit with said secondary input winding of said control relay and the primary contacts of each of the mercury relays when regulation of the pulsing period of the output signal is desired beyond the limits determined by the shorting switches, for energizing said secondary input winding of said control relay to a degree sufficient to overcome the bias applied to said primary input winding and to close said secondary contacts of said control relay;

said secondary contacts of said control relay being arranged to form with said second power source a second output circuit to provide a second output signal;

said adjustable biasing means introducing an adjustable delay in the operating time of said control relay, whereby fine adjustment is provided for the pulse-period of the second pulse-type output signal, such pulse-period being determined by (1) the number of cycles of the alternating control signal that the open-circuiting effect of the primary contact terminals is negated, and (2) the additional time within a cycle that said secondary contacts of said control relay are closed after the adjustable time delay.

References Cited by the Examiner

UNITED STATES PATENTS

| | | | |
|---|---|---|---|
| 1,837,337 | 12/1931 | Roberts | 321—70 |
| 2,852,701 | 9/1958 | Lemard | 317—140 |
| 2,917,680 | 12/1959 | Hallas | 317—140 |
| 3,052,802 | 9/1962 | Beloungie | 307—106 |

JOHN F. COUCH, *Primary Examiner.*

LLOYD McCOLLUM, *Examiner.*

G. J. BUDOCK, G. GOLDBERG, *Assistant Examiners.*